June 8, 1943. H. J. SAUER 2,321,251
AUTOMOTIVE ACCESSORY
Filed Oct. 14, 1939
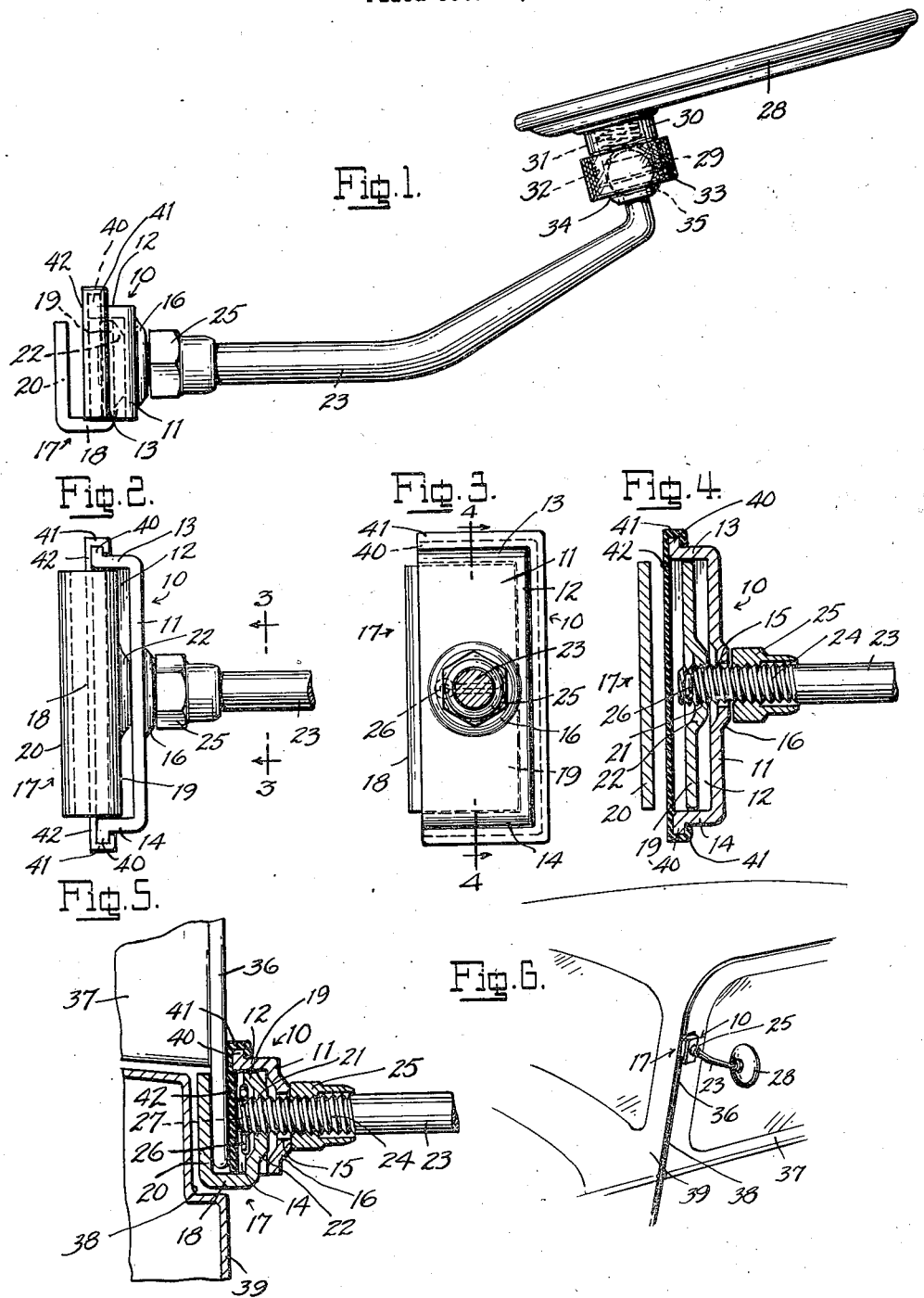
INVENTOR
HENRY J. SAUER.
BY
ATTORNEY Patented June 8, 1943

2,321,251

UNITED STATES PATENT OFFICE 2,321,251

AUTOMOTIVE ACCESSORY

Henry J. Sauer, Fairfield, Conn., assignor to The Kilborn-Sauer Company, Fairfield, Conn., a corporation of Connecticut Application October 14, 1939, Serial No. 299,397

5 Claims. (Cl. 248—226)

The present invention relates to a rear vision mirror bracket, particularly of the type adapted for securing to the forward flanged edge of an automobile door, such flanged edge fitting into an angular recess in the door frame in the closed position of the door.

It is an object of the invention to provide an automotive accessory bracket with a new clamp means which makes a neat and space-closing or engaged surface fit against the outer surface of the door of a car without the necessity for drilling into the door, and which will in no way distort or mar the surface of the door. Another object is to provide a bracket which may be secured rigidly to the door, and by means of which the mirror supporting bracket arm may be adjusted to any desired angular position, thus adapting it to the right or left side of an automobile, and will be rigidly secured in such position.

A further object is to provide a single securing means which is adapted to fasten the bracket to the door and simultaneously fix the mirror supporting arm in its angularly adjusted position.

It is also a purpose to provide a bracket in which there are no exposed screw heads, and which does not require the use of a screw driver to secure it. Another object is to provide a bracket which when secured to the car door is theft proof. To this end it is proposed to provide means for permanently retaining the parts of the bracket and the mirror supporting arm together, and in combination with such means a bracket structure which when secured to the door flange cannot be removed when the door is in closed position. Consequently when the door is locked the bracket and mirror supporting arm cannot be removed by an unauthorized person, even if such person succeeds in loosening the securing means.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a plan view of a rear view mirror bracket and mirror, according to the exemplary illustrated embodiment of the invention.

Fig. 2 is a front elevation, the mirror supporting bracket arm being broken away.

Fig. 3 is a side elevation, the mirror supporting bracket arm being shown in section, taken along the line 3—3 of Fig. 2.

Fig. 4 is a vertical sectional view, taken along the line 4—4 of Fig. 3.

Fig. 5 is a horizontal sectional view showing the bracket secured to the door structure.

Fig. 6 is a perspective view of a portion of an automobile and showing the bracket mounted thereon.

Similar reference characters indicate corresponding parts throughout the several figures of the drawing.

Referring to the drawing, the rear-view mirror bracket, according to the exemplary illustrated embodiment shown therein, comprises an outer clamping member 10 in the form of a rectangular box or housing consisting of a side wall 11, a rear wall 12, and top and bottom walls 13 and 14, the inner and forward sides being open. The side wall 11 is provided centrally with a non-threaded aperture 15, and in surrounding relation to the aperture the wall is provided with an annular outward embossing 16, forming an annular recess at the inner side and an annular projected nut bearing platform at the outer side, for engagement by the securing nut, as will presently more fully appear. The bottom or inner edge of the housing cover member 10 is provided with an outwardly projecting rim flange 40 with which is interlockingly engaged the internally grooved bead 41 provided about three sides of a rectangular shoe 42 formed of rubber or other suitable resilient material and adapted to engage between the flange 40 and the outer surface of the door to protect the latter.

The inner clamping member 17 in the form of a yoke or U-part in cross section consists of a forward vertical wall 18, and rearwardly bent parallel spaced side walls 19 and 20, the vertical dimension or length of this inner clamping member being slightly less than the interior vertical dimension of the outer clamping member 10, so that the side wall or clamp operating portion 19 fits telescopically and movably within it, while the side wall 20 in the form of a clamping jaw is disposed in spaced parallel relation to the housing bottom or the inner surface of the rubber shoe 42 of the outer clamping member to provide a clamping space or jaw within which is engaged the flange of the door, as will presently more fully appear.

The side wall 19 is provided centrally with a passage or threaded aperture 21, in line with and of smaller diameter than the aperture 15 of the outer clamping housing member, and in surrounding relation to this aperture 21 the side wall is provided with an annular outward embossing 22, forming an annular recess at the inner side and an annular projected portion at the outer side which is adapted to fit into the annular recess of the outer clamping member. The two openings 15 and 21, for reception of the fixture arm 23, are coaxially disposed in the housing 10 and yoke 17.

The mirror supporting bracket arm 23 is provided at its inner end with a screw threaded portion 24, upon which is engaged a nut 25, this nut adapted to bear upon the projected annular bearing surface or outer wall 11 of the outer clamping member, and the inner end of the threaded portion being loosely engaged through the aperture 15 of the outer clamping member and screwed into the threaded aperture 21 of the operation portion 19 of the clamping yoke 17. The coaxial screw thread means 24, 25 and the end of the nut bearing against the housing wall 11 constitutes operating means for the clamp.

A cotter pin 26 is engaged through a hole 27 in the inner end of the bracket arm and is disposed within the annular recess of the inner clamping member, its function being to prevent outward disengagement of the arm 23 from the inner clamping member through unscrewing rotation of the arm. It will be understood that instead of the cotter pin other suitable means may be employed to prevent removal of the arm, as for instance, retaining lugs swedged upon the inner end of the arm after assembly, or a headed over end. The rubber shoe 42 prevents engagement of the inner end of the arm 23 with the surface of the door.

Upon the outer end of the arm there is adjustably mounted for universal adjustment movement a rear view mirror element 28, the adjustable mounting consisting of a ball end 29 formed upon the end of the arm and engaged in an exteriorly threaded nipple 30 secured to the mirror casing, a spring 31 being disposed within the nipple and pressing a concave-convex bearing plate 32 against the ball surface. A cap nut 33, provided with a spherical shoulder 34 having an aperture 35, is screwed upon the nipple 30 to retain the ball in assembled relation with the nipple, the spherical shoulder 34 fitting the ball surface and the aperture 35 being substantially larger than the neck of the arm 23 adjacent the ball, so that the connection may have universal swivelling movement about the ball to adjust the position of the mirror. The compressed spring exerts sufficient pressure to retain the position of the mirror frictionally, the nut 33 being loosened to reduce this friction during adjustment. An automobile fixture or accessory, other than the rear vision mirror 28, may be mounted on the arm 23.

The device is mounted on the door by placing the clamping means astride the door flange 37. Thus the yoke 17 straddles the door flange edge. Then the accessory device is secured to the forward edge flange 36 of the door 37 by backing the nut 25 outwardly upon the arm 23 so that the movable clamping jaw formed between the flange 20 and the inner surface of the outer clamping member is opened sufficiently to engage the flange 36. The nut 25 is then screwed inwardly just enough to cause the outer and inner clamping members 20 and 10 to engage the door flange, and with the nut in this slightly loose relation the arm 23 is turned to the desired position of angular adjustment where it is held by the threaded engagement of the screw threads 24 with the threaded hole 21 of the inner clamping member. Thereupon the nut 25 is tightened by means of a suitable wrench, this tightening action drawing the inner and outer clamping members into rigid tight clamping relation with the door flange and at the same time fixing the adjusted position of the fixture-supporting arm 23, the nut acting as a lock nut in cooperation with the threaded engagement of the arm with the threaded aperture 21.

The housing 10 seats with an engaged surface fit, in a space-closing manner, against the outer surface of the door flange 36. This outer housing clamping member 10 constitutes or forms a stationary jaw at rest against the outside of the door, while the yoke flange or wall 20 acts as a movable jaw and is drawn or forced toward the inside of the door, and hence toward said stationary jaw, by the operation of the screw means 24, 25 cooperating with the housing 10 and the operating flange portion 19 of the yoke 17.

In the closed position of the door, the flange 36 engages within an angular recess 38 of the door frame 39, there being sufficient clearance between the flange and the recess to receive the flange 20 of the inner clamping member. In some types of doors the door flange is provided at its inner surface with a rubber sealing strip which resiliently engages the recess 38, and in this case the flange 20 will preferably be inserted between the strip and the door flange. In the closed position of the door the end wall of the recess 38 is opposed to the edge of the door flange 36, so that it is impossible to remove the clamping member from the door, even if it is loosened by unscrewing the nut 25. It is impossible to remove the bracket, and as the arm 23 and nut 25 are permanently connected to the bracket by means of the cotter pin 26, it will be impossible for unauthorized persons to remove the supporting arm 23 with its mirror 28 or other automotive fixture. The assembly is therefore effectually theft proof as long as the automobile, door is locked in closed position.

The bottom 40 of the housing 10, with or without the enclosing pad 42, constitutes the stationary jaw of the clamping device when mounted on the door flange 36, and the yoke outer wall or flange 20 constitutes the other or movable jaw. The housing 10 makes a space-closed fit of neat appearance and improved utility with the outer surface of the door.

I have illustrated and described a preferred and satisfactory embodiment of the invention, but it will be understood that changes may be made therein, within the spirit and scope thereof, as defined in the appended claims.

Having thus described my invention what I claim and desire to secure by Letters Patent is:

1. An automotive accessory device comprising a housing forming a stationary jaw adapted to seat against the outer surface of an automobile door, a clamping yoke having an operating portion mounted within the housing, said yoke being adapted to straddle the door flange, and including a movable jaw engaging the inner surface of the door flange, an opening extending through the housing coaxial with another opening provided through the operating portion of the yoke, an arm supporting a fixture and having its inner end disposed through the two coaxial openings, means on the inner end of the arm to secure it within the housing; and screw means carried by the device, in cooperative relation with the housing and with the operating portion of the yoke, for drawing the movable jaw toward said housing to anchor the device on the door.

2. An automotive accessory device comprising a housing forming a stationary jaw adapted to seat against the outer surface of an automobile door, a clamping yoke having an operating portion mounted within the housing, said yoke being adapted to straddle the door flange, and including a movable jaw reaching around the door flange edge to grip the inner surface of the door, the housing being provided with an aperture extending therethrough, an arm means carrying a fixture and having an inner end portion extending through the aperture, means disposed on the inner extremity of said inner end portion of the arm means for securing the latter in the housing; and screw means carried by the device, in cooperative relation with the housing and with the operating portion of the yoke, for drawing the jaw toward said housing to anchor the device on the door.

3. An automotive accessory device comprising a housing forming a stationary jaw adapted to seat against the outer surface of an automobile door, a clamping yoke having an operating portion mounted within the housing, said yoke being adapted to straddle the door flange, and including a movable jaw reaching around the door flange edge to grip the inner surface of the door, the housing being provided with an aperture extending therethrough, an arm carrying a fixture and having its inner end loosely disposed through the aperture and extending into the housing and being connected with the operating portion of the yoke therein, screw threads formed on the arm portion mounted through the aperture, and a clamping-nut screwed onto the screw-threaded arm portion and bearing against the housing for actuating the yoke and drawing the movable jaw toward said housing to anchor the device on the door.

4. An automotive accessory device comprising a housing forming a stationary jaw adapted to seat against the outer surface of an automobile door, a clamping yoke having an operating portion mounted within the housing, said yoke being adapted to straddle the door flange, and including a movable jaw reaching around the door flange edge to grip the inner surface of the door, the housing being provided with an aperture extending therethrough, an arm supporting a fixture and having a screw-threaded portion movably disposed through the aperture, and the inner end of said arm being connected with the yoke, whereby the housing is movable relatively on the arm and to the yoke, and a clamp operating nut screwed onto the screw-threaded portion of the arm and bearing against the outside of the housing at its aperture to draw the movable jaw toward said housing to anchor the device on the door.

5. An automotive accessory device comprising a housing forming a stationary jaw adapted to seat against the outer surface of an automobile door, a clamping yoke having an operating portion mounted within the housing, said yoke being adapted to straddle the door flange, and including a movable jaw reaching around the door flange edge to grip the inner surface of the door, the housing being provided with a non-threaded aperture extending therethrough, a screw-threaded aperture provided in the operating portion of the yoke coaxially with the non-threaded aperture of the housing, an arm means supporting a fixture and having an end portion extending through the two coaxial apertures, means on the inner extremity of the arm means securing same within the housing; and screw means disposed through the non-threaded aperture of the housing, in coaxial relation with the arm means and engaging the screw-threaded aperture of the yoke, for drawing the movable jaw toward said housing to anchor the device on the door.

HENRY J. SAUER.